United States Patent [19]

Andrews et al.

[11] 4,371,919
[45] Feb. 1, 1983

[54] LOAD DISTRIBUTION AMONG PARALLEL DC-DC CONVERTERS

[75] Inventors: Michael W. Andrews, Whippany; Carl J. Hoffmann, Morristown, both of N.J.

[73] Assignee: Bell Telephone Laboratories, Incorporated, Murray Hill, N.J.

[21] Appl. No.: 258,679

[22] Filed: Apr. 29, 1981

[51] Int. Cl.³ .......................................... H02M 3/335
[52] U.S. Cl. ..................................... 363/65; 363/21; 363/80; 363/56
[58] Field of Search .................................. 363/18-21, 363/55-56, 65, 71-72, 78-80; 307/53, 58, 60, 71, 82; 323/271, 272

[56] References Cited

U.S. PATENT DOCUMENTS

| | | | |
|---|---|---|---|
| 3,916,283 | 10/1975 | Burrows | 363/65 X |
| 3,956,638 | 5/1976 | Ahrens et al. | 307/48 |
| 4,074,146 | 2/1978 | Buonavita | 307/60 |
| 4,150,425 | 4/1979 | Nagano et al. | 363/71 X |
| 4,270,165 | 5/1981 | Carpenter et al. | 363/65 |
| 4,276,590 | 6/1981 | Hansel et al. | 307/82 X |

OTHER PUBLICATIONS

Mele, "100-KHz DC/DC Converter uses FETs", EDN, vol. 25, No. 17, Sep. 20, 1980, pp. 191-192.
Regan et al., "Design for VMOS Push-Pull Converters", Electronic Engineering, vol. 52, No. 638, May 1980, pp. 87-96.
"Regulating Pulse Modulator", Silicon General Linear Integrated Circuits Product Catalog, 1979, pp. 23-26.
"Application Notes-SG1524", Silicon General Linear Integrated Circuits Product Catalog, 1979, pp. 136-150.

*Primary Examiner*—William M. Shoop
*Assistant Examiner*—Peter S. Wong
*Attorney, Agent, or Firm*—R. O. Nimtz

[57] ABSTRACT

A control circuit (36) on the primary side of a converter senses the output voltage and is useful for modulating the drive pulse width of a switching transistor (30). An averaging circuit (78) averages the drive pulse and compares this average with an average of the drive pulses for all switching transistors in a system of parallel converters to produce an error signal. In response to the error signal, the drive pulse width is varied so that the load current is distributed evenly among the parallel converters to improve the system efficiency.

8 Claims, 4 Drawing Figures

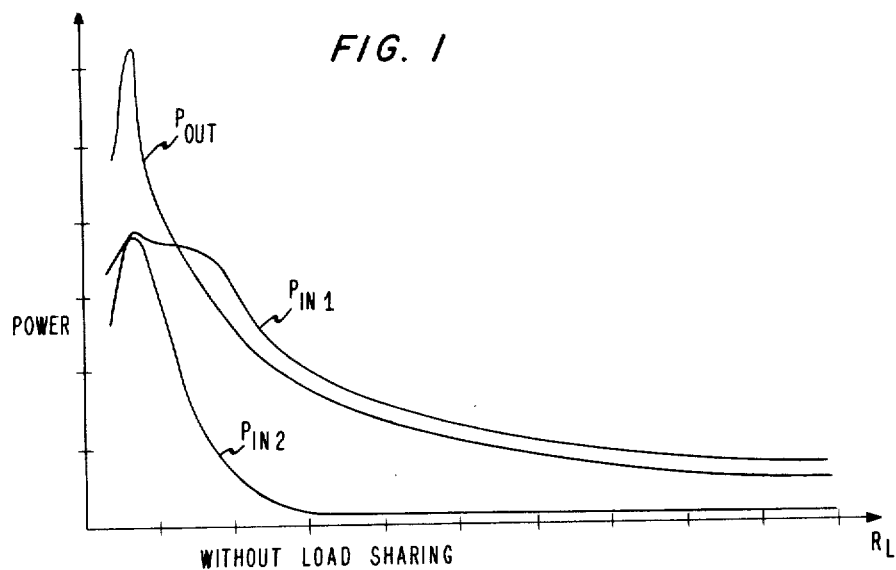
FIG. 1 — WITHOUT LOAD SHARING
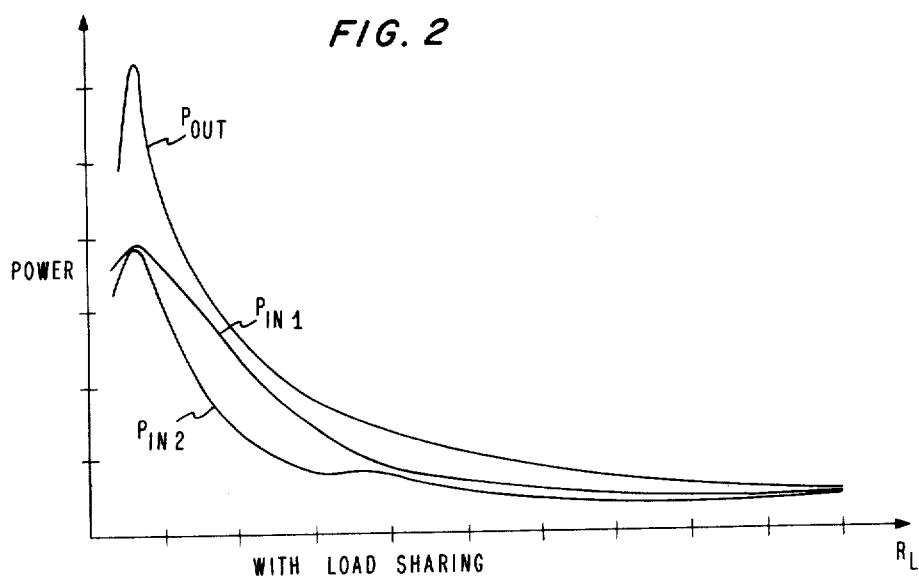
FIG. 2 — WITH LOAD SHARING

LOAD DISTRIBUTION AMONG PARALLEL DC-DC CONVERTERS

BACKGROUND OF THE INVENTION

1. Field of the Invention

This invention relates to parallel DC-DC converters and, in particular, to the distribution of a load evenly among the parallel converters.

2. Description of the Prior Art

When a power supply system comprising a plurality of DC-DC converters, connected in parallel, supplies power to a load, some of the converters carry less of the load than others. Such an uneven load distribution among the converters, particularly under light load conditions, creates noise which interferes with the fidelity of transmission of intelligence in telecommunications and is therefore unacceptable. Furthermore, the efficiency of the system is decreased because of uneven load distribution.

Many solutions have been proposed to insure uniform load distribution among converters. One solution calls for sensing the output current by locating a sensing device in the secondary or output circuit of each converter. A resistor, usually, is inserted in the secondary circuit, directly or indirectly, to develop a feedback signal. The feedback signal is compared with an average of all feedback signals to develop an error signal which is used to vary the pulse width of the signal which drives the switching transistor in that converter. While this method of sensing is desirable for low current output applications, the efficiency of the converter system drops in applications where the output current is high.

SUMMARY OF THE INVENTION

In accordance with the illustrative embodiment of the present invention, the efficiency of a system of voltage regulated parallel DC-DC converters is increased by sensing the output voltage on the primary side of the converter circuit by using a separate control winding and by using an external circuit for distributing the load current evenly among the converters. The load current is distributed in response to an error signal comprising the difference between the average value of the switching transistor drive voltage for a converter and the average value of the drive voltages for all converters. More particularly, in response to the error signal, the pulse width of the switching transistor is varied.

Furthermore, when one converter is shutdown because of a fault, that converter's switching transistor drive pulse is not included in the averaging process.

An advantage of the present invention is the isolation of line transients at the input of any converter from the outputs of the converters by connecting the converter primary (i.e., input) circuit and the control circuit elements in each converter to a common ground and the secondary (i.e., output) circuit elements to a separate ground connection.

BRIEF DESCRIPTION OF THE DRAWINGS

FIG. 1 shows power characteristics for a system of parallel DC-DC converters without load distribution;

FIG. 2 shows power characteristics for a system of parallel DC-DC converters with load distribution;

DETAILED DESCRIPTION

Referring to FIG. 1, there is shown a power characteristic $P_{OUT}$ for a system of two parallel converters as the load on the system varies. Also shown are power characteristics $P_{IN1}$ and $P_{IN2}$ for two converters in the system. As the system is loaded, one of the converters tends to carry more of the load than the other. This is shown by a part of the power characteristic $P_{IN1}$ for one converter being greater than the power characteristic $P_{OUT}$ for the system. Such an imbalanced distribution of load between parallel converters causes inefficient operation of the system and noise at lighter loads.

FIG. 2 shows the power characteristics for the system and the individual converters after load has been distributed evenly between the converters. Because there will be some loss in the system, i.e., because the system does not operate at 100 percent efficiency, the output from the system will not equal the sum of the power produced by each converter. In the ideal case of perfectly even distribution of load, the power characteristics of the individual converters will be the same.

Figure 3:
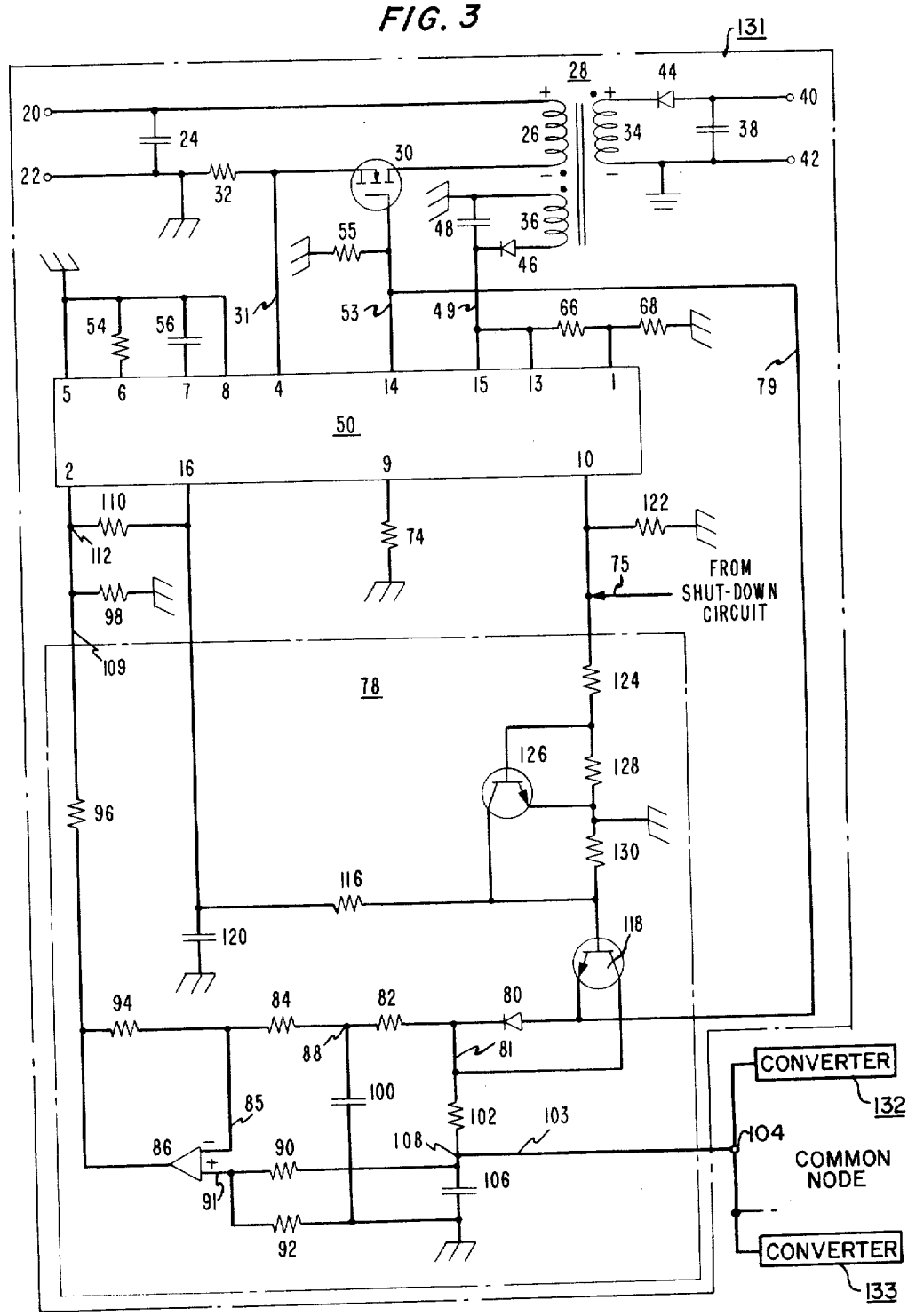
FIG. 3 shows a circuit for load distribution.

Referring to FIG. 3, there is shown a constant frequency DC-DC converter which is one of many converters 131-133 connected in parallel for providing power to a load. A DC input voltage connected across terminals 20 and 22 is filtered by capacitor 24. Terminal 20 is connected to one end of the primary winding 26 of transformer 28. The other end of the primary winding 26 is connected successively to a field effect transistor (FET) 30, to a current sensing resistor 32, and to terminal 22. Preferred to a bipolar transistor, FET 30 switches faster, has a very low ON resistance and therefore has lower power losses during ON-OFF and OFF-ON transitions. Terminal 22 is also connected to ground.

When FET 30 is turned ON, power from the DC input across terminals 20,22 delivered to the primary winding 26 is stored in the transformer core 28. When the FET 30 is turned OFF, the power stored in the core of transformer 28 is supplied to the secondary winding 34 and to control winding 36. Capacitor 38 filters the output from the converter to produce a direct current potential across the output terminals 40 and 42. Diode 44, connected between terminal 40 and the secondary winding 34, has a low ON-resistance when forward-biased, withstands a high reverse voltage when it blocks current flow in the reverse direction, and switches at high-speeds. Terminal 42 is connected to a ground reference which may be at a different potential from the input ground reference.

Control winding 36 senses the output voltage in the secondary winding 34. One end of control winding 36 is connected to ground. As stated below, the control winding 36 and primary winding 26 share the same ground. The other end of control winding 36 is connected to a diode 46 which prevents reverse flow of current. Capacitor 48 filters the control voltage for providing a DC voltage on lead 49 to ports 13 and 15 of a pulse width modulator control circuit 50.

Figure 4:
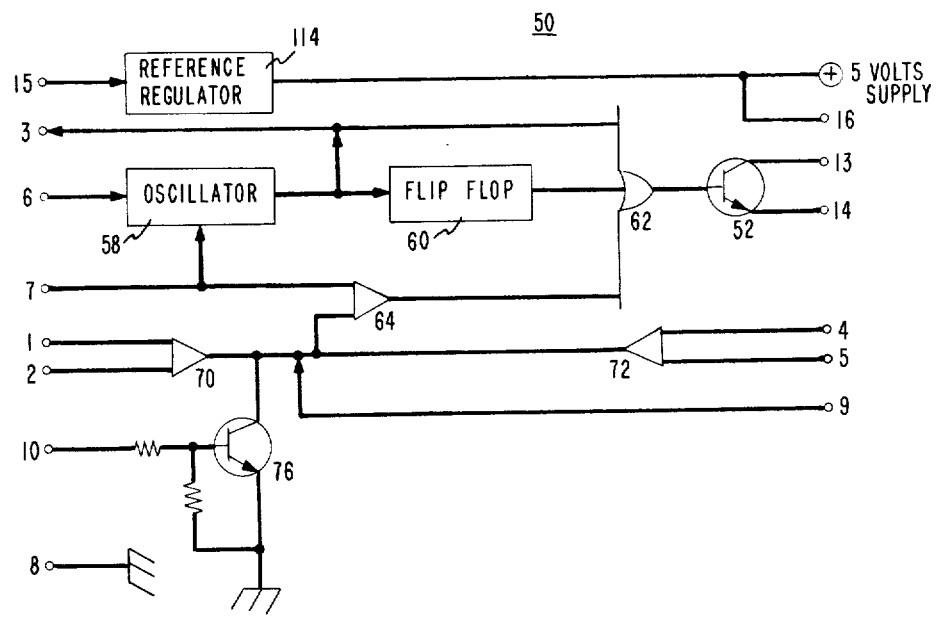
FIG. 4 shows a pulse width modulator control circuit such as the Silicon General, SG1524 integrated circuit.

Referring briefly to FIG. 4, there is shown the details of the pulse width modulator control circuit 50 of FIG. 3. Such control circuits are readily available commercial products such as the Silicon General, SG1524 integrated circuit, which is described in the Silicon General Linear Integrated Circuits Product Catalog 1979 at pages 23 to 26 and 136 to 150. Identical ports in FIGS.

3 and 4 and in the Product Catalog are assigned the same numbers for easy cross-reference.

Referring to FIGS. 3 and 4, the control voltage at port 13 is connected to the collector of transistor 52. The emitter of transistor 52 is connected to port 14 for providing the gate voltage or drive pulse on lead 53 to FET 30. By controlling the pulse width of the gate voltage on lead 53, the FET 30 ON time can be controlled. That is, by controlling the FET 30, the power delivered by the converter can be controlled. When the output power at terminal 40 is to be increased, the FET 30 should be kept ON longer. Likewise, when the output power is to be reduced, the FET 30 should be kept ON for a shorter period.

Resistor 54, connected between ground and port 6, and capacitor 56, connected between ground and port 7, together form a timing circuit for determining the constant frequency of operation of the converter. This constant frequency means the sum of the ON and OFF time of FET 30 will be constant. Constant frequency is useful in confining switching noise to a single frequency. Ports 6 and 7 are connected to an oscillator 58. Oscillator 58 provides pulses to flip-flop 60 and to NOR gate 62. Port 7 is also connected to comparator 64.

Resistors 66 and 68 together form a voltage divider for providing a voltage proportional to the sensed voltage, nominally 2.5 volts, to port 1. The aforementioned sensed voltage signal at port 1 is connected to an error amplifier 70, the output from which is connected through comparator 64 to NOR gate 62. Also connected to error amplifier 70 is a reference signal at part 2. Thus, the sensed voltage at port 1 is compared with the reference signal at port 2 to produce an error signal which is amplified by error amplifier 70. The error signal in turn is used to control the base signal on transistor 52, thereby controlling the width of the gate voltage drive pulse for FET 30.

Port 8 is connected to ground and is useful for providing a common ground for all components internal to control circuit 50. In accordance with an advantage of the present invention, the primary winding components and control circuit winding components are all connected to a common ground. The secondary winding components are connected to a separate ground connection. The effect of line transients is thus isolated to the primary side of the affected converter, thereby reducing the effect on the output of the system. That is, the input of each converter is isolated from its output.

Sensing resistor 32, connected in series between FET 30 and terminal 22, has a low resistance, about 0.4 ohms, for protecting the FET 30 against damage from abnormally high currents in the primary circuit. Lead 31 connects the junction of resistor 32 and FET 30 to port 4. Connected to port 5 is ground. Ports 4 and 5 are connected to a comparator 72 which in turn is connected through comparator 64 and NOR gate 62 to the base of transistor 52. When an abnormal current flows through resistor 32, a signal is transmitted over lead 31 to port 4. Comparators 72 and 64 operate to produce a high input to NOR gate 62 which in turn produces a low output thereby turning off the transistor 52. Consequently, the gate voltage at port 14 over lead 53 is removed from FET 30, thereby turning it OFF and protecting it from damage.

Resistor 74, connected between port 9 and ground, has a high resistance for setting the gain of the amplifiers in elements 70 and 72 for determining their response.

When the output voltage appearing across terminals 40 and 42 exceeds an upper limit or drops below a lower limit, a signal appears (from apparatus not shown) on lead 75 and at port 10 to shutdown the converter. The shutdown signal at port 10 provides the base voltage for turning on transistor 76. The effect is to turn off transistor 52, thereby removing the gate voltage to FET 30 which in turn is turned OFF. In order to insure that FET 30 is turned OFF rapidly, lead 53 is connected through resistor 55 to ground. Likewise, resistor 122 connected to port 10 insures that spurious shutdown signals do not erroneously cause the converter to be shutdown.

The gate voltage provided to FET 30 from port 14 on lead 53 is also supplied on lead 79 to an averaging circuit 78. As described hereinbelow, circuit 78 is useful for performing the following functions: for averaging the gate voltage on lead 79, for averaging the gate voltage signals for all converters in the system, for comparing the two above-mentioned signals and for providing an error signal in response thereto. In accordance with this invention, the error signal is useful in adjusting the pulse width for the gate voltage signal on lead 53.

Lead 79 feeds the gate voltage from lead 53 through diode 80, resistors 82 and 84 to the differential amplifier 86. Resistors 84,90,92,94 and 96 set the gain for the differential amplifier 86. Capacitor 100 averages the gate voltage appearing at terminal 88. The gate voltage signal fed through diode 80 also appears via lead 81 through resistor 102 and common bus 103 to the common node 104. Capacitor 106 averages the signals on common bus 103. The gate voltages from all other converters 132-133 appear on common bus 103 and are averaged along with the gate voltage from lead 79. This common average signal is fed through resistor 90 via lead 91 to differential amplifier 86 for comparison with the averaged gate voltage for the particular converter on lead 85. The error signal is transmitted on lead 109 to adjust the reference voltage at node 112.

The control winding 36 is also useful for supplying power to operate the control circuit 50 by supplying an operating voltage at port 15. This voltage at port 15 is transmitted through reference regulator 114 to develop a reference voltage, usually 5 volts, at port 16. The reference voltage at port 16 is reduced by voltage divider comprising resistors 98 and 110 to about 2.5 volts at node 112. Thus, the aforementioned error signal on lead 109 from the differential amplifier 86 is used to adjust this 2.5 volts reference. The adjusted reference signal then appears at port 2. The sensed voltage at port 1 and the adjusted reference signal at port 2 are then compared in error amplifier 70. As stated hereinabove, the output signal from error amplifier 70 ultimately determines the ON time for transistor 52 which results in determining the width of the gate pulse, i.e., the duty cycle of FET 30.

The reference voltage from port 16 also provides the base voltage through resistor 116 to transistor 118. Capacitor 120 filters the reference voltage from port 16. As stated hereinabove, when a shutdown signal appears on lead 75, the FET 30 will be turned OFF. It is also necessary to insure that the signal on lead 79 will not be included in the average signal on bus 103 and node 108 and thereby erroneously affect the operation of the system. Therefore the shutdown signal on lead 75 is fed through voltage divider comprising resistors 128 and 124 thereby turning on the transistor 126. The reference voltage from port 16 supplies current through the collector-emitter path of transistor 126 to ground, thereby removing the base current to transistor 118 and turning it off.

What is claimed is:

1. Apparatus for distributing load currents evenly among a plurality of parallel converters each of said converters comprising a primary side comprising a primary winding (26) and a switching transistor (30) said switching transistor being switched on by a variable width drive pulse supplied to the gate of said switching transistor, a secondary side comprising a secondary winding (34), for generating an output voltage, a load circuit connectable to said secondary winding thereby drawing a load current, means (36) on said primary side of each of said converters for sensing a voltage representative of said output voltage and said load current, said representative voltage being used to produce said variable width drive pulse, said load current distributing apparatus characterized by means (78) for producing a first average value of said variable width drive pulses for each of said converters, means (104) for producing a second average value of said first average values from all of said converters, means (86) for comparing said first and second average values for each of said converters, and means in each of said converters (50) responsive to said comparison means (50) for varying the width of said drive pulses to said switching transistor (30).

2. The load distributing apparatus according to claim 1 further characterized in that said switching transistor (30) is a field effect transistor.

3. The load distributing apparatus according to claim 2 further characterized by means (116,118,124,126,128,130) for excluding from said second averaging means the drive pulse for any one of said converters in response to a shutdown signal.

4. The load distributing apparatus according to claim 3 further characterized in that said excluding means responsive to said shutdown signal, said comparing means, said sensing means, and said primary side in each of said converters share a common ground.

5. A circuit for distributing load current evenly among a plurality of DC-DC converters each comprising a primary winding, and a secondary winding, said load current distributing circuit characterized by a field effect transistor (30) switch connected in series with said primary winding (26) in each of said converters, a pulse width modulator (50) for controlling the duty cycle of said field effect transistor by varying the width of each of a plurality of pulses for driving said field effect transistor in response to a comparison of a first average value of said drive pulses supplied to each of said converters and a second average value of said drive pulses supplied to all of said converters.

6. The load distribution circuit according to claim 5 further characterized in that said sensing circuit comprises a sense winding (36) having a diode (46) connected in series with said sense winding and a capacitor (48) connected in parallel across said sense winding for producing a direct current signal, and a voltage divider (66,68) for reducing the magnitude of said sensed direct current signal and for connecting said sensed signal to said pulse width modulator.

7. The load distribution circuit according to claim 5 further characterized in that said reference signal is generated by an error circuit comprising an operational amplifier (86) having first (85) and second (91) leads, said first lead being connected to a first capacitor (100) and a first resistor (82) for generating said first average value, and said second lead being connected to a second capacitor (106), a second resistor (102) and a common bus (103) for generating said second average value.

8. The load distribution circuit according to claim 7 further characterized by a shutdown circuit responsive to overvoltage and undervoltage conditions for shutting down any one of said converters, said shutdown circuit comprising a first transistor (118) having its emitter and collector electrodes connected to said first and second leads to said operational amplifier (86), respectively, and its base electrode being connected to a voltage supply (16), and a second transistor (126) having its collector and emitter electrodes connected to the base electrode of said first transistor (118) and to ground, respectively, and its base electrode connected to a lead (75) for transmitting a shutdown signal.

* * * * *